United States Patent
Cheng et al.

(10) Patent No.: US 7,054,316 B2
(45) Date of Patent: May 30, 2006

(54) METHOD AND SYSTEM FOR INTERLAYER CONTROL BETWEEN RE-SEQUENCING AND RETRANSMISSION ENTITIES

(75) Inventors: Mark W. Cheng, San Diego, CA (US); Liangchi (Alan) Hsu, San Diego, CA (US)

(73) Assignee: Nokia Corporation, Espoo (FI)

( * ) Notice: Subject to any disclaimer, the term of this patent is extended or adjusted under 35 U.S.C. 154(b) by 1031 days.

(21) Appl. No.: 10/026,616

(22) Filed: Dec. 27, 2001

(65) Prior Publication Data
US 2002/0191544 A1  Dec. 19, 2002

Related U.S. Application Data

(60) Provisional application No. 60/286,035, filed on Apr. 25, 2001.

(51) Int. Cl.
*H04L 12/28* (2006.01)
*H04L 12/56* (2006.01)

(52) U.S. Cl. ............ 370/394; 370/469; 370/474; 714/18; 714/748

(58) Field of Classification Search ........... 370/236, 370/349, 394, 469, 474, 216, 428; 714/18, 714/748, 749
See application file for complete search history.

(56) References Cited

U.S. PATENT DOCUMENTS

| | | | |
|---|---|---|---|
| 5,940,769 A * | 8/1999 | Nakajima et al. | 455/509 |
| 6,076,181 A | 6/2000 | Cheng | |
| 6,519,223 B1 * | 2/2003 | Wager et al. | 370/216 |
| 6,760,860 B1 * | 7/2004 | Fong et al. | 714/4 |
| 6,931,569 B1 * | 8/2005 | Fong et al. | 714/18 |
| 2001/0032325 A1 * | 10/2001 | Fong et al. | 714/118 |
| 2002/0021698 A1 * | 2/2002 | Lee et al. | 370/394 |
| 2002/0097809 A1 | 7/2002 | Jiang | |
| 2005/0237994 A1 * | 10/2005 | Fong et al. | 370/349 |

* cited by examiner

*Primary Examiner*—Ajit Patel
*Assistant Examiner*—Chuong Ho
(74) *Attorney, Agent, or Firm*—Alston & Bird LLP

(57) ABSTRACT

The present invention is related to a method and system for interlayer control where a Protocol Data Unit (PDU) is received from a lower protocol layer at a upper layer where the lower and upper layer are both involved in a retransmission function, a re-sequencing function, or both functions. The lower layer signals the upper layer for retransmission of a PDU when the retransmissions of that PDU have been exhausted and failed at the lower layer. The signaling scheme from the lower layer to the upper layer is an ABORT notification. This ABORT notification comes with associated parameters to indicate to the upper layer which PDU can be requested for retransmission from the upper layer.

45 Claims, 3 Drawing Sheets

METHOD AND SYSTEM FOR INTERLAYER CONTROL BETWEEN RE-SEQUENCING AND RETRANSMISSION ENTITIES

This application claims the benefit of U.S. Provisional Patent Application No. 60/286,035, filed Apr. 25, 2001, the contents of which is incorporated by reference herein in its entirety.

BACKGROUND

1. Field of the Invention

This invention relates to re-sequencing and retransmission entities at a network node, and more specifically to efficient interlayer control between re-sequencing and retransmission entities at a network node.

2. Discussion of the Related Art

Mobile devices such as mobile phones, Personal Digital Assistants (PDAs), laptop computers, etc. are becoming increasingly more popular. 3G (Third Generation Mobile System) is a generic name for a set of mobile technologies which use a host of high-tech infrastructure networks, handsets, base stations, switches and other equipment to allow mobile devices to offer high speed Internet access, data, video, and CD-quality music services. Most 3G services are related to technologies based on Code Division Multiple Access (CDMA). CDMA is a digital wireless technology that allows multiple users to share radio frequencies at the same time without interfering with each other. CDMA2000 is one new high-speed version of CDMA that is used by 3G services.

1×EV-DV is one variant of the CDMA2000 3G standard. 1×EV-DV is a variant and an evolution of the cdma2000 1× radio transmission technology (1× RTT) that includes systems optimized for packet data services, with a flexible architecture based on internet protocol (IP) protocols, and that can be embedded in handsets, laptops, notebooks and other fixed, portable and mobile devices.

Radio Link Protocol (RLP) is a link layer protocol used with a CDMA2000 traffic channel to support CDMA data services. It has retransmission and re-sequencing procedures to reduce the frame error rate (FER) exhibited by CDMA traffic channel. RLP is a pure NAK-based protocol in data transfer.

Hybrid Automatic Retransmission Request (HARQ) is a link-adaptation technique that is employed by 1×EV-DV. HARQ employs multiple instances of an acknowledgment-based stop-and-wait ARQ protocol. Each instance is termed as a phase. HARQ also uses combining techniques on the original and retransmitted packets to improve the retransmission operation. The combining techniques can be soft combining such as Chase combining or incremental redundancy (IR). Some HARQ variables include: (1) NARQP, the total number of HARQ phases; (2) MAXRETRANS, the maximum number of HARQ retries before the RF frame is abandoned; and (3) AI, the instance of HARQ phases.

Employing HARQ in 1×EV-DV, link layer receivers (e.g., RLP) may no longer need to carry out the retransmission request for missing data frames since retransmission using HARQ procedures provides satisfactory residual frame error rate for data services. A re-sequencing function still needs to be performed above HARQ whether by RLP or another entity. Frames buffered after the missing frame can only be passed on to the upper layer when the physical layer retransmission of the missing frame is abandoned by the HARQ.

Synchronous HARQ imposes a constraint that all frames are delivered in a fixed order of multiple HARQ instances (or phases), i.e., the frames are sent over HARQ phases 1, 2, 3, 4, 1, 2, 3, 4, . . . , etc., if the total HARQ phase is 4. Therefore, the delay and sequence of frame delivery is somewhat predictable.

Currently, re-sequencing entities rely on a timer-based scheme to determine when to quit waiting for the missing frame for sequential delivery to the upper layer. In timer-based schemes, a timer is started whenever a missing data frame is detected. The maximum waiting time to "give up" the missing frame is between when the frame is declared missing and when a new frame is received from the same HARQ instance (or phase). Therefore, the maximum waiting time is composed of two portions: (1) the time between when the frame was NAKed in the physical layer for the first time and the time the same missing frame is was actually detected by the link layer at the receiver, i.e., $T_{miss\_frame}$, (2) the time required for HARQ to exhaustedly retransmit the missing frame, i.e., NARQP×MAXRETRANS. The time, $T_{miss\_frame}$, consists of at least the following required time: (1) a frame inter-arrival time to the transmitter between the missing frame and the next received frame, which facilitates the detection of the missing frame at the re-sequencing entity; and (2) a base station scheduling delay. This latter delay (2) occurs since with multiple data instances, the new frame, which will facilitate the detection of the missing frame, is not necessarily sent immediately after the missing frame depending on transmission priority.

1×EV-DV also employs asynchronous HARQ where the data is sent with accompanying phase information, AI, (possibly out of sequence) indicated in the control channel. In this case, the timer-based scheme can no longer work since the transmitter is not following a phase sequence order and timing cannot be predicted as to when exactly the abandonment will happen. Packets may be sent based on priority, and not on sequence number.

Current solutions for both synchronous and asynchronous HARQ are problematic since when a packet is missing, the physical layer may request retransmission and a link layer (e.g., RLP) does not know how long to wait before sending a NAK. Further, a transmission side may send a missing frame twice due to a retransmission request from the HARQ and a NAK from the link level. Moreover, a re-sequencing problem exists since the link layer may be receiving frames out of sequence (asynchronous HARQ) or out of sequence due to missing frames (synchronous HARQ). These situations also cause a further problem in that they require a link layer to have an increased buffer requirement.

Therefore, an inter-layer control scheme between retransmission and re-sequencing entities is needed that eliminates the delay and re-sequencing problems and allows reduced buffer requirement at the link layer.

SUMMARY

The present invention is related to a method for interlayer control where a Protocol Data Unit (PDU) is received from a lower protocol layer at an upper layer where the lower and upper layer are involved in a retransmission function, a re-sequencing function, or both functions. The PDU has an associated sequence number. It is determined if the sequence number is the same as a previously received sequence number from a previous PDU. It is determined if the previous PDU has been sent to a second layer at the second network node if the sequence number is not the same as the previously received sequence number. The PDU is stored if the previous PDU has been sent to the second layer. An abort message for the previous PDU is sent to the second layer if the sequence number is not the same as the previously received sequence number and the previous PDU was not sent to the second layer. The PDU is decoded if no abort was sent. It is determined if a Cyclic Redundancy Check (CRC) for the PDU is valid. A message is sent to the first network node where the message is an ACK message if the CRC is valid, and a NAK message if the CRC is not valid.

An abort message may be sent that includes the Service Reference identification (SR_ID) that is the recipient of this SDU, a number of new PDUs in the SDU, and a number of retransmitted PDUs in the SDU. The PDU may be a packet or a frame. The first layer may be a physical layer including a Hybrid Automatic Retransmission Request (HARQ) entity. The second layer may be a link layer including a Radio Link Protocol (RLP) entity. The first network node may be a base station and the second network node a mobile station, or vice versa.

The present invention is also related to a system for interlayer control that includes a first network node and a second network node. The first network node has a link layer, a Medium Access Control (MAC) sublayer, and a physical layer. The first network node sends one or more Protocol Data Units (PDUs) to the second network node where each PDU has an associated sequence number. The second network node has a second link layer, a second Medium Access Control (MAC) sublayer, and a second physical layer. The second physical layer receives the PDUs and identifies a missing PDU by checking the sequence number of each received PDU. The second physical layer issues a retransmission request to the first network node for any missing PDUs. Whenever a maximum number of retransmission requests for a specific PDU is reached at the second physical layer, the second physical layer sends an abort message to the second link layer through the second MAC layer for the specific PDU.

The link layer may send a MAC-SDUReady.Request primitive to the MAC sublayer initiating the sending of a MAC Service Data Unit (SDU). The MAC-SDUReady.Request primitive may contain a type of the SDU, a size of the SDU, and a prioritization indicator where the prioritization indicator indicates to the MAC sublayer how to prioritize fragments of the PDU relative to other types of MAC sublayer traffic. The SDU type may consist of new or retransmitted. The link layer may send a data primitive to the MAC sublayer carrying an SDU or a fragment of an SDU to be transmitted to the second network node. The data primitive further may contain a type of the SDU and a size of the SDU.

Moreover, the present invention is further related to a method for interlayer control where one or more PDUs are sent from a first network node to a second network node, each PDU having an associated sequence number. A missing PDU is identified at the second network node by checking the sequence number of each received PDU. The second network node issues a retransmission request to the first network node for the missing PDU. An abort message for the missed PDU is sent from a physical layer at the second network node to a link layer at the second network node whenever a maximum number of retransmission requests for the missed PDU is reached.

The present invention is also related to an article consisting of a storage medium with instructions stored therein. The instructions when executed causing a computing device to perform: receiving a Protocol Data Unit (PDU) from a first network node at a first layer of the computing device, the PDU having an associated sequence number for the PDU; determining if the sequence number is the same as a previously received sequence number from a previous PDU; determining if the previous PDU has been sent to a second layer at the computing device if the sequence number is not the same as the previously received sequence number; storing the PDU if the previous PDU has been sent to the second layer; sending an abort message for the previous PDU to the second layer if the sequence number is not the same as the previously received sequence number and the previous PDU was not sent to the second layer; decoding the PDU if no abort was sent and determining if a Cyclic Redundancy Check (CRC) for the PDU is valid; and sending a message to the first network node where the message is an ACK message if the CRC is valid and a NAK message if the CRC is not valid.

Additionally, the present invention is related to a mobile station that includes a retransmission entity and one or more re-sequencing entities. The retransmission entity receives at least one Protocol Data Unit (PDU) from a network node where each PDU having an associated sequence number for the PDU, identifies a missing PDU by checking the sequence number of each received PDU, issues a retransmission request to the network node for the missing PDU, and sends an abort message for the missed PDU to the at least one re-sequencing entity whenever a maximum number of retransmission requests for the missed PDU is reached.

The mobile station may be any mobile device, for example, a mobile phone, a Personal Digital Assistant (PDA), or a laptop computer.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

Figure 1:
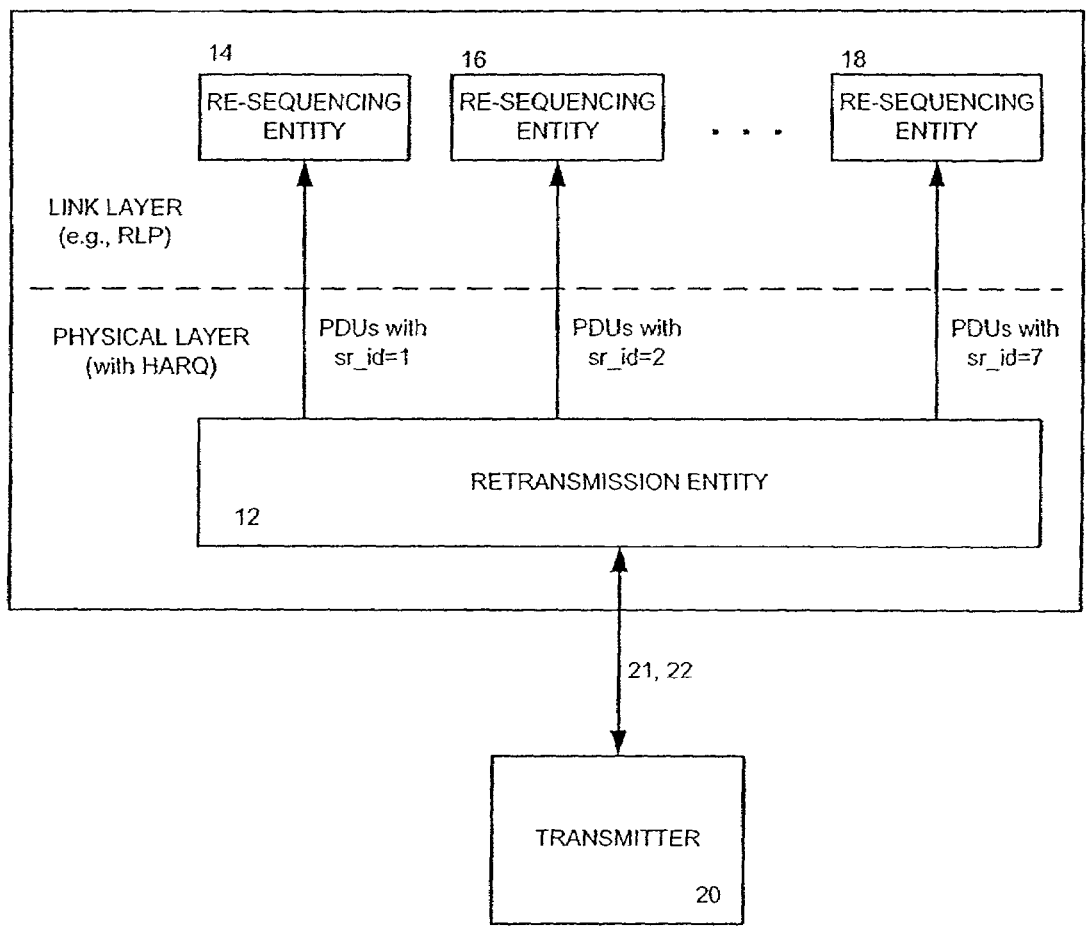
FIG. 1 is a block diagram of a system for inter-layer control according to an example embodiment of the present invention.

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

The present invention relates to methods and systems for interlayer control between a retransmission entity and a re-sequencing entity that solves the problems of current systems by providing early abort notification from the retransmission to the re-sequencing entity for any missing data units. Protocol Data Units (PDUs) will be used to illustrate the present invention where a PDU may be in the form of a packet or a frame. Missing PDUs are identified by checking the sequence number of each received PDU. The retransmission entity issues retransmission requests for all missing PDUs. A maximum number of retransmission requests may be set whereby, upon reached, the retransmission entity sends an early abort notification, aborting the missed PDU, to the re-sequencing entity. Therefore, entities at the link layer no longer need to wait an excessive amount of time for the missed PDU, and can make a decision earlier on whether to send another retransmission request after receiving the early notification abort message. Thus, methods and systems according to the present invention reduce the delay, increases throughput performance, and lowers buffering requirements at the link layer.

According to methods and systems according to the present invention, RLP, or any other link layer receiver, no longer needs to carry out the retransmission request for a missing PDU (e.g., data frame or packet) since retransmission using HARQ provides satisfactory Residual Frame Error Rate for data services. Re-sequencing may still need to be performed above HARQ, whether by RLP or some other entity. PDUs buffered after the missing PDU may only be passed onto the upper layer when the physical retransmission of the missing PDU is abandoned by the HARQ. Knowledge of the exact timing of the abandonment not only reduces memory requirement for data buffering but also increases the throughput for the data service.

FIG. 1 shows a block diagram of a system for inter-layer control according to an example embodiment of the present invention. A first network node 10 and a second network node 20 may transmit and receive information across data channel 21 and control channel 22 (both shown as a single line). The interface between network node 10 and network node 20 may be a wireless "over air" interface. In this example embodiment, second network node 20 is the transmitter and first network node 10 is the receiver of the information being transmitted. FIG. 1 shows the relationship between the re-sequencing entity, 14–18,and retransmission entity 12 where HARQ resides at a physical layer of network node 10 and handles Service Data Unit (SDU) retransmission, and a link layer protocol (e.g., RLP) handles PDU re-sequencing. Each network node 10 may contain only one HARQ entity that may consist of multiple stop-and-wait "instances" or "phases", while each mobile node 10 may also support multiple concurrent data services that require multiple RLP instances concurrently. This is shown by the multiple re-sequencing entities 14–16 at the link layer of network node 10. Each re-sequencing entity 14–18 handles re-sequencing for a different PDU each having a unique identification, e.g., Service Reference ID (sr_id).

Inter layer control between retransmission and re-sequencing is especially critical for 1×EV-DV of 3GPP2 (Third Generation Partnership Project 2) and high speed downlink packet access (HSDPA) of 3GPP because these two technologies employ HARQ at the physical layer. The nature of HARQ retransmission changes the behavior of a link layer for re-sequencing and eliminates the retransmission function of the link layer also. A proper inter-layer control reduces the re-sequencing buffer requirement at the link layer and also increases the throughput by aborting unnecessary waiting for sequential delivery at the link layer.

HARQ is an acknowledgment-based protocol. A link layer protocol performs re-sequencing and passes received data to an upper layer, e.g., RLP of CDMA2000, which may perform in the transparent mode without link level retransmission. According to the present invention, whenever the HARQ retransmission is exhausted or a new data PDU is received (i.e., receiving PDU with different sequence number from the same HARQ instance), the HARQ may send an abort indication to the re-sequencing layer. The re-sequencing layer may assume that the abandoned PDU is always the first (i.e., "oldest") missing PDU in its re-sequencing buffer since there is no retransmission function in its entity.

To implement the present invention, a control primitive between retransmission and re-sequencing entities may be defined as shown in the Table 1 if the re-sequencing entity is RLP. However, the present invention is not limited to the re-sequencing entity being RLP, and the re-sequencing entity may be any re-sequencing entity and still be within the spirit and scope of the present invention.

TABLE 1

| Primitive Type | Primitive | Parameters | Description |
| --- | --- | --- | --- |
| Indication | RLP-Abort | SR_ID | Set to the SR_ID of the service instance sent on the control channel |
| | | npdu | The number of continuous MuxPDUs in this physical layer SDU |

This primitive assumes that each physical layer SDU can accommodate multiple Multiplex Sublayer Protocol Data Units (MuxPDU) for this data instance. Specifically, according to the present invention, in order for an HARQ to notify the correct service instance, the Service Reference ID (SR_ID) and number of MuxPDUs (hereinafter referred to as PDUs) in this physical layer SDU may need to be sent on the control channel (e.g., Shared Control Channel, Dedicated Pointer Channel, etc.), accompanying the traffic channel which carries the data. These parameters specify the SR_ID and the number of data frames during each instance of HARQ phases (Al).

Therefore, additional data fields, SR_ID and N_PDU may be carried in the control channel between network nodes. SR_ID in may be a length of three bits. N_PDU may be, for example, a length of three bits (which assumes every physical data unit can allocate up to eight link data units). A transmitting network node conveys this information relative to the current transmitted data PDU. A receiving network node then may use the same information to set an early abort notification control primitive when the data PDU's transmission is unsuccessful. Therefore, a transmitter sets the SR_ID field to the SR_ID value stored in the PDU. Moreover, a transmitter may concatenate multiple MuxPDUs from the SR_ID and, therefore, use the N_PDU field to store the number of MuxPDUs in this physical layer SDU. The data structure including the SR_ID and N_PDU fields may be expanded into an array of the same data structure if multiplexing different data service frames is allowable.

Previously, the problems associated with timer-based approaches for synchronous HARQ were discussed where the maximum waiting time consisted of two portions, a $T_{miss\_frame}$ portion and a time required for HARQ to exhaustedly retransmit a missing PDU (i.e., NARQP*MAXRETRANS). In methods and systems according to the present invention, this first portion of waiting time ($T_{miss\_frame}$) is not needed. According to the present invention, a HARQ retransmission entity fully utilizes its knowledge of retransmission status and provides early notification to a re-sequencing entity to expedite the higher layer PDU re-sequencing process. A summary of comparison between timer based schemes and inter-layer control according to the present invention is shown in Table 2. TTI represents Transmission Time Interval.

TABLE 2

| | Timer-based scheme | Present invention |
|---|---|---|
| Waiting Time to Abort a "missing" PDU at re-sequencing entity (in number of TTI) | $T_{miss\_frame}$ + (NARQP*MAXRETRANS) | NARQP*MAXRETRANS |

Note that the present invention outperforms a timer-based scheme. Moreover, the present invention avoids the use of using timers, especially multiple timers for multiple missing frames. Starting a timer for each missing data PDU requires immense overhead of processing power just to maintain all of these timers. This overhead is especially apparent since data PDUs usually arrive out of sequence with the lower layer retransmission. In methods and systems according to the present invention, a transmitter gives up on an erroneous PDU after NARQP*MAXRETRANS TTIs after the transmission of a missing PDU. This abandonment may be detected and predicted by an HARQ entity at a receiver and indicated to a re-sequencing layer at the receiver by an early abort notification primitive as noted previously.

The problem of timer-based schemes is magnified by asynchronous HARQ. In asynchronous HARQ, the data may be sent with accompanying phase information (AI) out of sequence as indicated in the control channel. Time-based schemes cannot work in these situations since a transmitter is not following a phase sequence and timing cannot be predicted as to when the abandonment will occur. However, the present invention allows pinpointing of the exact time when an abort occurs therefore working even under asynchronous HARQ.

HARQ resides at a physical layer, however, a link layer HARQ may also be used to achieve higher residual FER. Whenever a re-sequencing entity receives an early abort notification, instead of giving up on the abandoned PDU, the re-sequencing entity may NAK this PDU to start another round of HARQ retransmission. The incorporation of HARQ and link ARQ (e.g., non-transparent mode RLP in CDMA2000) establishes a "dual layer" ARQ scheme where the HARQ is ACK-based and the link ARQ is NAK-based. This dual-layer ARQ causes the complexity of not only retransmission coordination between the two, but also the complexity of the re-sequencing at the link layer. Due to the complexity, a link ARQ may be configured as an optional function at a network node. For instance, for 1xEV-DV, RLP ARQ may be disabled and RLP may be configured to be in "transparent mode".

According to the present invention, a "dual layer" ARQ scenario may be handled in a special way to reduce implementation complexity. This special treatment leverages the current CDM 2000 1x RLP ARQ scheme. HARQ at the physical layer may handle transmission for two types of PDUs: (1) Type 1, the new PDUs that a re-sequencing entity (e.g., RLP) has not yet been aware of; and (2) Type 2, the "old and erroneous" PDUs that a re-sequencing entity has been aware of and has requested retransmission. For these two types of PDUs, early abort notification according to the present invention at the physical layer handles them in different way. A re-sequencing entity may also handle them differently. The physical layer may send early abort notification to notify the link layer to abort only Type 1 PDUs as described previously, but may not need to do the same for Type 2 PDUs. Moreover, the RLP re-sequencing entity may also expect to receive early abort notification only for Type 1 PDUs, but may treat Type 2 PDUs as specified in the current IS-2000 RLP specification, where a NAK-list for "old and erroneous" PDUs is established and retransmission timers are used to manage a NAK-list. In this example embodiment of the present invention, since only Type 1 PDUs are involved in early abort notification, the N_PDU may be defined as the number of Type 1 PDUs (i.e., excluding Type 2) in a MuxPDU. For example, N_PDU=0, if only Type 2 PDUs will be sent in a HARQ phase. Therefore, early abort notification according to the present invention works for both transparent RLP mode and non-transparent RLP mode, therefore, making it highly desirable for packet data with high data rates in 1xEV-DV technologies.

Figure 2:
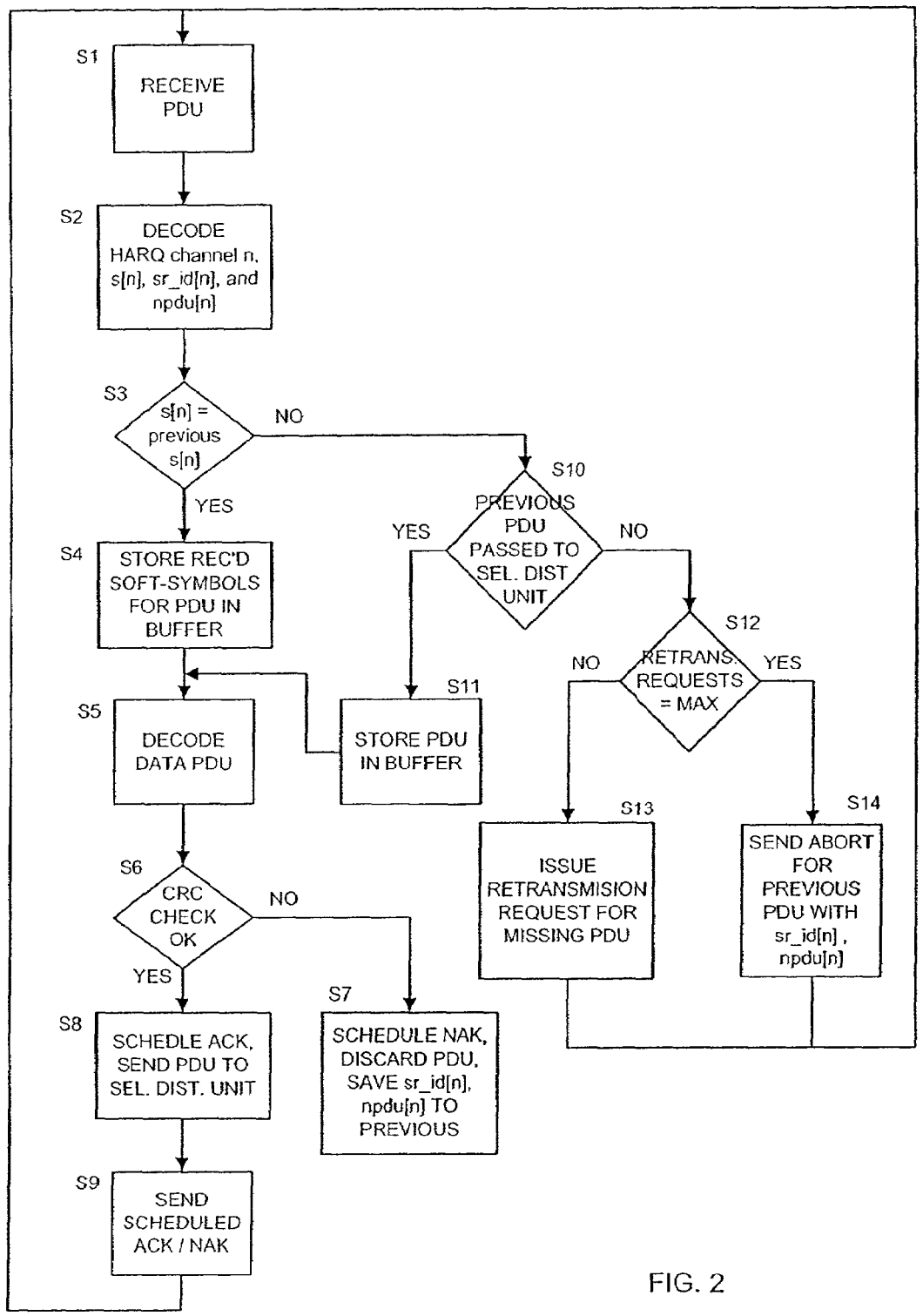
FIG. 2 is a flowchart for inter-layer control at a receiver according to an example embodiment of the present invention.

FIG. 2 shows a flowchart for inter-layer control at a receiver according to an example embodiment of the present invention. The processes in FIG. 2 may occur every transmission time interval (TTI) millisecond. A PDU is received S1. The HARQ channel number n, track SR_ID for the current HARQ channel, sr_id[n], the associated sequence number, s[n], and the track number of MuxPDUs for the current HARQ channel, npdu [n] are decoded S2. It is then determined whether the sequence number of the received PDU is the same as a previous transmission S3. If the HARQ channel sequence number, s(n) is the same as a previously transmission, this denotes that the received PDU may be a retransmitted PDU, and received soft symbols for the PDU are stored in a buffer S4. The data PDU is then decoded S5. A Cyclic Redundancy Check (CRC) is checked for the received data PDU to determine if it is valid S6, and if the CRC is not valid, a NAK is scheduled, PDU discarded, and the sr_id[n] for the current HARQ channel and number of MuxPDUs for the current HARQ channel are saved with previous versions S7. If the CRC checks out ok, an ACK is scheduled and the PDU passed to a Selection Distribution Unit S8. The Selection Distribution Unit is an entity that combines the data from different network nodes (e.g., base stations, mobile stations, etc.) and provides the data to the application. Any scheduled ACK or NAK are then sent S9, and a process repeats for the next received PDU S1.

If the HARQ channel sequence number, s(n), is not the same as a previous sequence number, it is determined whether the previous PDU was passed to the Selection Distribution Unit S10, and if so, the PDU is stored in a buffer S11, and the decoding of the data PDU proceeds S5. If the previous PDU has not been passed to the Selection Distribution Unit, it is determined whether the number of retransmission requests has reached a maximum number S12. If the number of retransmission requests has not reached a maximum number, a retransmission request is issued for the missing PDU S13. If the number of retransmission requests has reached a maximum number, an abort indication is sent to the link layer for the previous PDU that contains the parameters sr_id[n] (the Service Reference ID of the service instance sent on the control channel) and the number of continuous MuxPDUs in this physical layer SDU (npdu[n]) S14.

Therefore, according to the present invention, RLP at the link layer may declare a PDU as a missing PDU only when the physical layer retransmission of this PDU is abandoned by the HARQ. RLP may then pass on PDUs buffered after the missing PDU to the upper layer (transparent RLP) or NAK the missing PDU by building a NAK list (non-transparent RLP). The incorporation of HARQ and non-transparent mode RLP establishes a "dual layer" ARQ scheme. Since HARQ at the physical layer handles two types of PDUs, an RLP receiver may need to know the PDU type so that it could identify the exact PDUs that were abandoned by the HARQ retransmission when the abort message was received.

Figure 3:
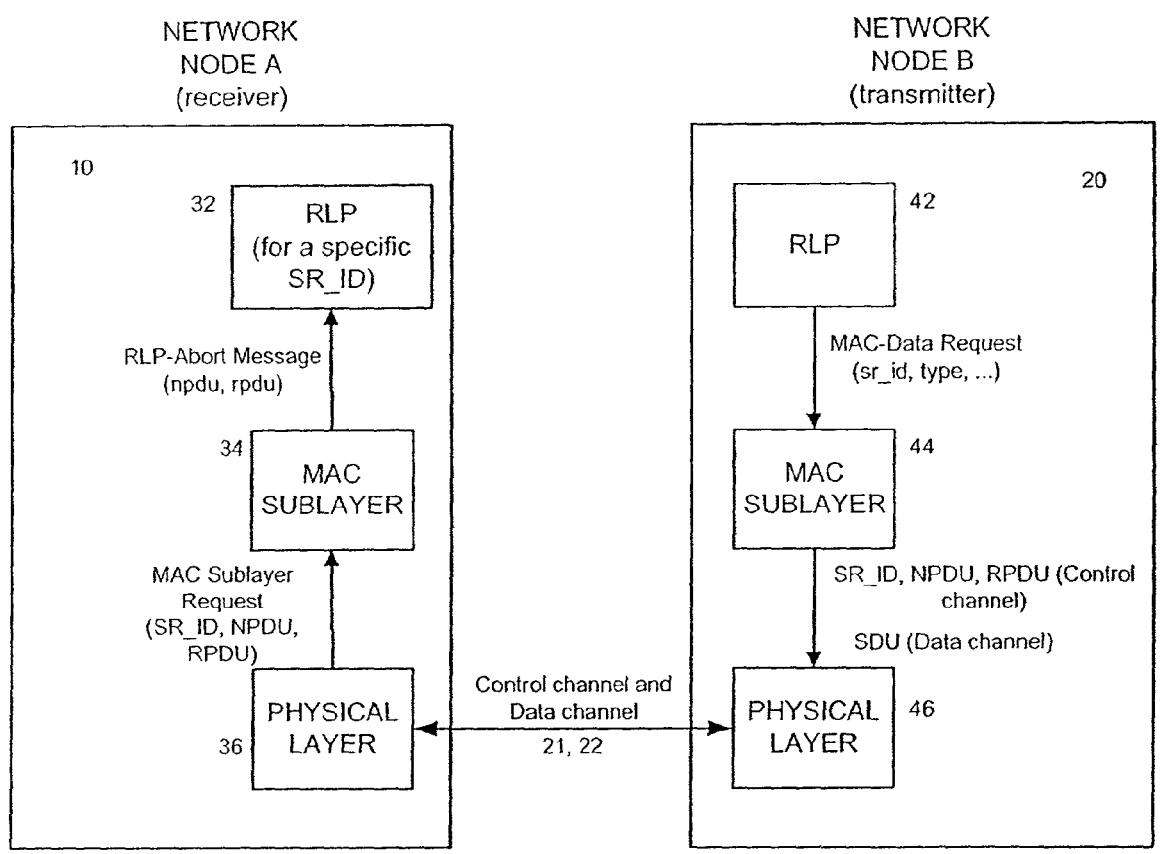
FIG. 3 is a block diagram of data and control flow between network nodes in a system for inter-layer control according to an example embodiment of the present invention.

FIG. 3 shows a block diagram of data and control flow between network nodes in a system for inter-layer control according to an example embodiment of the present invention. Network node A, 10 transmits and receives information from a second network node B, 20 via control and data channels 21, 22. Network node 10 may be a mobile station such as a mobile phone, Personal Digital Assistant (PDA), laptop computer, etc., or may be a base station. Mobile node B, 20 may be a base station or a mobile station also. For the purpose of illustrating the present invention, network node 10 will be assumed to be a mobile station (i.e., node) and network node 20 a base station. Therefore, the control and data information transmitted on channels 21, 22 are across a wireless interface.

Network node 10 may include a physical layer 36, Medium Access Control (MAC) sublayer 34, and an RLP for the specific service reference ID, 32. Similarly, network node 20 may include a physical layer 46, MAC sublayer 44, and RLP 42.

As discussed previously, an abort message may be a service primitive which may be sent from a MAC sublayer ARQ to an RLP whenever the HARQ retransmission is exhausted. This early abort notification control primitive between MAC sublayer 34 and RLP entity 32 may be enhanced as shown in the Table 3 below.

TABLE 3

| Primitive Type | Primitive | Parameters | Description |
| --- | --- | --- | --- |
| Indication | RLP-Abort | SR_ID | Set to the SR_ID of the SDU service instance sent on the control channel |

TABLE 3-continued

| Primitive Type | Primitive | Parameters | Description |
| --- | --- | --- | --- |
| | | npdu | The number of new MuxPDUs in this physical layer SDU |
| | | rpdu | The number of retransmitted MuxPDUs in this physical layer SDU |

This table is similar to table 1, shown previously, except that a new parameter, rpdu, has been added to the abort primitive.

In order for an HARQ residing at physical layer 36 to notify the correct RLP instance 32, the number of new (i.e., npdu) and retransmitted (i.e., rpdu) MuxPDUs in this physical layer SDU may need to be sent on the control channel 22 accompanying the traffic channel 21 that carries the data. Control channel 22 may be a Forward Shared Common Control Channel (FSHCCH) or Forward Secondary Packet Data Control Channel (F-SPDCCH) and traffic channel 21, may be a Forward Shared Common Channel (FSHCH) or Forward Packet Data Channel (F-PDCH). However, the present invention is not limited to these types of control and/or data channels between network nodes.

Network node 20, i.e., transmitter, conveys the parameters relevant to the current transmitted data PDU. Network node 10, receiver, then uses the same information to set an abort message control primitive when the data PDU's transmission is unsuccessful.

Table 4 shows example fields and lengths for these parameters from the transmitter (network node 20) side.

TABLE 4

| Field | Length (bits) |
| --- | --- |
| SR_ID | 3 |
| N_PDU | 3 |
| R_PDU | 3 |

The transmitter may set the SR_ID field to the sr_id value stored in MuxPDU. The transmitter may concatenate multiple multiplex layer PDUs from the same SR_ID. The N_PDU field may be used by the transmitter to store the number of new MuxPDUs (i.e., Type 1) in this physical layer SDU. The R_PDU field may be used to store the number of retransmitted MuxPDUs (i.e., Type 2) in this physical layer SDU.

Service interface primitives received by a MAC sublayer 44 from an RLP transmitter 42 may need to incorporate a type field to identify Type 1 or Type 2 PDUs as shown in Table 5 below.

TABLE 5

| Primitive Type | Primitive | Parameters | Description |
| --- | --- | --- | --- |
| Request | MAC-SDU Ready | | Initiates sending of a MAC SDU |
| | | type | The type of the SDU (new or retransmitted) |
| | | size | The size of the SDU in bits |

TABLE 5-continued

| Primitive Type | Primitive | Parameters | Description |
|---|---|---|---|
| | | scheduling_hint | An indicator to the multiplex sublayer on how to prioritize fragments of the Layer 2 encapsulated PDU relative to other types of multiplexed traffic |
| Request | MAC-Data | | In response to an MAC-Availability.Indication primitive, this primitive carries the data to be transmitted |
| | | type | The type of the SDU (new or retransmitted) |
| | | data | An SDU or a fragment of an SDU |
| | | size | The size of the data in bits |

Table 5 shows two primitives, a MAC-SDUReady.Request primitive and an MAC-Data.Request primitive. The MAC-SDUReady.Request primitive includes three parameters, type, size, and scheduling_hint. The MAC-SDUReady.Request primitive may initiate sending of a MAC SDU. The type parameter denotes the type of the SDU (new or retransmitted). The size parameter is the size of the SDU in bits. The scheduling_hint parameter is an indicator to the multiplex MAC sublayer 42 on how to prioritize fragments of an encapsulated PDU relative to other types of multiplex traffic.

The MAC-Data.Request primitive includes the parameters type, data, and size. This primitive may be generated in response to a MAC-Availability.Indication primitive, and carries the data to be transmitted. The type parameter is the same as noted previously, and the data parameter is a SDU or a fragment of an SDU. The size parameter is the size of the data in bits.

Methods and systems according to the present invention are advantageous in that the delay is reduced and throughput performance is increased while lowering buffer requirement at a link layer. Moreover, the delay problem and re-sequencing problem that currently exist in timer-based schemes are overcome. The present invention allows improvement in wireless IP and wireless high-speed packet data technology, e.g., in CDMA2000 1×-EV-DV and 3GPP HSDPA, but is not limited to use in these technologies. Moreover, although the present invention was illustrated assuming use 1×EV-DV technology and with base stations and mobile stations, the present invention is not limited by these and may be applied to any and all technologies or computing devices requiring inter-layer control and that are within the spirit and scope of the present invention. The present invention may be implemented in software and reside at every network node in a network since most network nodes provide both transmission and reception functions.

It is noted that the foregoing examples have been provided merely for the purpose of explanation and are in no way to be construed as limiting of the present invention. While the present invention has been described with reference to a preferred embodiment, it is understood that the words that have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for interlayer control comprising:
    receiving a Service Data Unit (SDU) containing at least one Protocol Data Unit (PDU) across a channel from a first network node at a first layer of a second network node, the PDU having an associated sequence number for the PDU;
    determining if the sequence number is the same as a previously received sequence number from a previous PDU;
    determining if the previous PDU has been sent to a second layer at the second network node if the sequence number is not the same as the previously received sequence number, and storing the PDU if the previous PDU has been sent to the second layer;
    sending an abort message for the previous PDU to the second layer if the sequence number is not the same as the previously received sequence number and the previous PDU was not sent to the second layer;
    decoding the PDU if no abort was sent;
    determining if a Cyclic Redundancy Check (CRC) for the PDU is valid; and
    sending a message to the first network node, the message being an ACK message if the CRC is valid and a NAK message if the CRC is not valid.

2. The method according to claim 1, further comprising receiving and decoding a channel number transmitting the SDU, a service instance identification of a service instance receiving this SDU, and a total number of PDUs in the SDU.

3. The method according to claim 2, further comprising sending an abort message that includes the service instance identification and the total number of PDUs aborted for this SDU in this channel.

4. The method according to claim 2, further comprising sending an abort message that includes the service instance identification, a number of new PDUs in the SDU, and a number of retransmitted PDUs in the SDU.

5. The method according to claim 2, wherein the service instance identification comprises a Service Reference ID (SR_ID).

6. The method according to claim 1, wherein the PDU comprises at least one of a packet and a frame.

7. The method according to claim 1, further comprising receiving soft-symbols with the PDU and storing the soft-symbols if the sequence number is the same as the previously received sequence number from the previous PDU.

8. The method according to claim 1, further comprising receiving soft-symbols with the PDU and storing the soft-symbols if the sequence number is not the same as the previously received sequence number and the previous PDU was not sent to the second layer.

9. The method according to claim 1, wherein the first layer comprises a physical layer including a Hybrid Automatic Retransmission Request (HARQ) entity.

10. The method according to claim 1, further comprising requesting retransmission of the previous PDU before the sending of the abort.

11. The method according to claim 10, further comprising requesting retransmission of the previous PDU up to a maximum number of retransmission requests until the previous PDU is received.

12. The method according to claim 11, further comprising sending the abort message for the previous PDU to the second layer after the number of retransmission requests reaches the maximum number.

13. The method according to claim 11, further comprising send a NAK message to the first network node by the second layer after receipt of the abort message, the NAK message causing the first layer to request retransmission of the previous PDU again up to a maximum number of retransmission requests until the previous PDU is received.

14. The method according to claim 1, wherein the second layer comprises a link layer including a Radio Link Protocol (RLP) entity.

15. The method according to claim 1, wherein the first network node is a base station and the second network node is a mobile device.

16. The method according to claim 1, wherein the first network node is a mobile device and the second network node is a base station.

17. A system for interlayer control comprising:
a first network node, the first network node having a link layer, a Medium Access Control (MAC) sublayer, and a physical layer, the first network node sending at least one Protocol Data Unit (PDU) to the second network node, each PDU having an associated sequence number for the PDU; and
a second network node, the second network node having a second link layer, a second Medium Access Control (MAC) sublayer, and a second physical layer, the second physical layer receiving the at least one PDU and identifying a missing PDU by checking the sequence number of each received PDU, the second physical layer issuing a retransmission request to the first network node for any missing PDUs,
wherein whenever a maximum number of retransmission requests for a specific PDU is reached at the second physical layer, the second physical layer sends an abort message to the second link layer through the second MAC layer for the specific PDU.

18. The system according to claim 17, wherein the link layer and the second link layer include a Radio Link Protocol entity.

19. The system according to claim 17, wherein the physical layer and the second physical layer include a Hybrid Automatic Retransmission Request (HARQ) entity.

20. The system according to claim 17, wherein the link layer sends a MAC-SDUready.Request primitive to the MAC sublayer initiating the sending of a MAC Service Data Unit (SDU), the MAC-SDUReady.Request primitive containing a type of the SDU, a size of the SDU, and a prioritization indicator, the prioritization indicator indicating to the MAC sublayer how to prioritize fragments of the PDU relative to other types of MAC sublayer traffic.

21. The system according to claim 20, wherein the SDU type comprises one of new and retransmitted.

22. The system according to claim 20, wherein the link layer sends a data primitive to the MAC sublayer carrying one of an SDU and a fragment of an SDU to be transmitted to the second network node, the data primitive further containing a type of the SDU and a size of the SDU.

23. The system according to claim 22, wherein the SDU type comprises one of new and retransmitted.

24. The system according to claim 17, wherein the first network node is a base station and the second network node is a mobile device.

25. The system according to claim 17, wherein the first network node is a mobile device and the second network node is a base station.

26. A method for interlayer control comprising:
sending at least one Protocol Data Unit (PDU) from a first network node to a second network node, each PDU having an associated sequence number for the PDU;
identifying a missing PDU at the second network node by checking the sequence number of each received PDU, the second network node issuing a retransmission request to the first network node for the missing PDU; and
sending an abort message for the missed PDU from a physical layer at the second network node to a link layer at the second network node whenever a maximum number of retransmission requests for the missed PDU is reached.

27. The method according to claim 26, wherein the first network node is a base station and the second network node is a mobile device.

28. The method according to claim 26, wherein the first network node is a mobile device and the second network node is a base station.

29. An article comprising a storage medium with instructions stored therein, the instructions when executed causing a computing device to perform:
receiving a Protocol Data Unit (PDU) from a first network node at a first layer of the computing device, the PDU having an associated sequence number for the PDU;
determining if the sequence number is the same as a previously received sequence number from a previous PDU;
determining if the previous PDU has been sent to a second layer at the computing device if the sequence number is not the same as the previously received sequence number, and storing the PDU if the previous PDU has been sent to the second layer;
sending an abort message for the previous PDU to the second layer if the sequence number is not the same as the previously received sequence number and the previous PDU was not sent to the second layer;
decoding the PDU if no abort was sent and determining if a Cyclic Redundancy Check (CRC) for the PDU is valid; and sending a message to the first network node, the message being an ACK message if the CRC is valid and a NAK message if the CRC is not valid.

30. The article according to claim 29, further comprising receiving and decoding a channel number transmitting the PDU, an identification of a service instance including the PDU, a total number of PDUs in the SDU, and the sequence number after the receiving step.

31. The article according to claim 30, further comprising sending an abort message that includes the service reference identification and the total number of PDUs for the channel.

32. The article according to claim 30, further comprising sending an abort message that includes the service instance identification, a number of new PDUs in the SDU, and a number of retransmitted PDUs in the SDU.

33. The article according to claim 30, wherein the service instance identification comprises a Service Reference ID.

34. The article according to claim 29, wherein the PDU comprises at least one of a packet and a frame.

35. The article according to claim 29, wherein the first layer comprises a physical layer including a Hybrid Automatic Retransmission Request (HARQ) entity.

36. The article according to claim 29, further comprising requesting retransmission of the previous PDU before the sending of the abort.

37. The article according to claim 36, further comprising requesting retransmission of the previous PDU up to a maximum number of retransmission requests until the previous PDU is received.

38. The article according to claim 37, further comprising sending the abort message for the previous PDU to the second layer after the number of retransmission requests reaches the maximum number.

39. The article according to claim 37, further comprising send a NAK message to the first network node by the second layer after receipt of the abort message, the NAK message causing the first layer to request retransmission of the previous PDU again up to a maximum number of retransmission requests until the previous PDU is received.

40. The article according to claim 29, wherein the second layer comprises a link layer including a Radio Link Protocol (RLP) entity.

41. A mobile station comprising:
a retransmission entity; and
at least one re-sequencing entity,
wherein the retransmission entity receives at least one Protocol Data Unit (PDU) from a network node, each PDU having an associated sequence number for the PDU, identifies a missing PDU by checking the sequence number of each received PDU, issuing a retransmission request to the network node for the missing PDU, and sends an abort message for the missed PDU to the at least one re-sequencing entity whenever a maximum number of retransmission requests for the missed PDU is reached.

42. The mobile station according to claim 41, wherein the PDU comprises one of a packet and a frame.

43. The mobile station according to claim 41, wherein the retransmission entity comprises a Hybrid Automatic Retransmission Request (HARQ) entity.

44. The mobile station according to claim 41, wherein the at least one re-sequencing entity comprises a Radio Link Protocol (RLP) entity.

45. The mobile station according to claim 41, wherein the mobile station comprises one of a mobile phone, a Personal Digital Assistant (PDA), and a laptop computer.

\* \* \* \* \*